United States Patent Office
3,441,559
Patented Apr. 29, 1969

3,441,559
PREPARATION OF 9(11)-DEHYDRO STEROIDS FROM THEIR 11β-HYDROXY COUNTERPARTS
David R. Buss, Kalamazoo, Mich., assignor to The Upjohn Company, Kalamazoo, Mich., a corporation of Delaware
No Drawing. Filed Dec. 20, 1967, Ser. No. 691,989
Int. Cl. C07c 167/14
U.S. Cl. 260—239.55      10 Claims

ABSTRACT OF THE DISCLOSURE

This invention relates to a novel process for the dehydration of steroids, more particularly to the preparation of 9(11)-dehydro steriods from their 11β-hydroxy counterparts.

In its broadest aspect, the present invention covers the 9(11)-dehydration of any 11β-hydroxy starting steroid of the androstane series or pregnane series, namely, by chemical removal of the elements of water from the 11β-position of the steriod molecule, illustratively represented as follows:

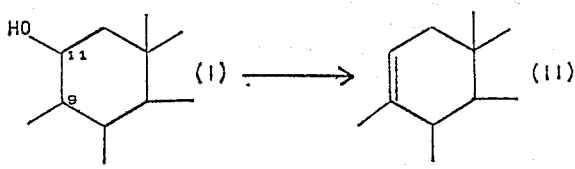

Pregnane series is defined herein as those compounds containing the carbon atom skeleton:

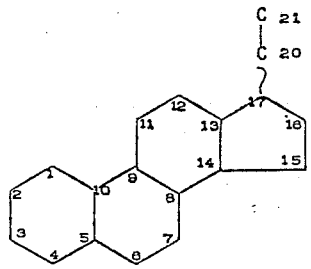

in which the carbon-carbon linkages can be either single or double bonded, and which can have carbon and/or other atoms as substituents attached to the carbon atom skeleton.

Androstane series is defined herein as those compounds exclusive of the pregnane series containing the carbon atom skeleton:

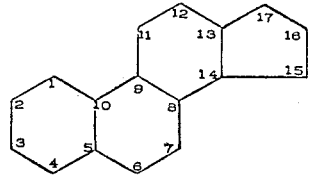

in which each of the carbon-carbon linkages can be either single or double bonded, and which can have carbon and/ or other atoms as substituents attached to the carbon atom skeleton.

BRIEF SUMMARY OF THE INVENTION

The novel process of this invention comprises (1) mixing an 11β-hydroxy steroid (I) of the androstane or pregnane series under anhydrous conditions in an organic base with anhydrous sulfur dioxide and (2) contacting the thus produced steroid-sulfur dioxide solution with a halogen (e.g., chlorine, bromine or iodine) or a sulfuryl halide (e.g., sulfuryl chloride, sulfuryl bromide or sulfuryl iodide). The thus formed corresponding 9(11)-dehydro steroid (II), in high yield, is easily separated from the reaction mixture, e.g., by filtration. This process has been found to be broadly applicable in readily dehydrating the 11β-hydroxy group of the steroid molecule with the resulting formation of the corresponding 9(11)-dehydro compound (II). Certain of these compounds (II) exhibit physiological activity (e.g., mineralocorticoid, glucocorticoid, anti-inflammatory, anabolic, androgenic and estrogenic); they are additionally useful as intermediates in the preparation of other physiologically active steroid compounds. For example, 9(11)-dehydro-desoxycorticosterone acetate, 9(11)-dehydroprogesterone, 9(11) - dehydro - 17α - hydroxycorticosterone acetate, 9(11) - dehydro - 17α - hydroxy - progesterone, 9(11) - dehydrotestosterone acetate, 9(11) - dehydroestradiol acetate, etc., have a high degree of activity and can be prepared by the process of the present invention from the corresponding 11β-hydroxy steroids (I). The $\Delta^{9(11)}$-steroids (II) are also useful in the production (by conventional methods) of 9α-fluoro(and chloro)-11β-hydroxy analogs of known physiologically active adrenal cortical and sex hormones, especially those also possessing the $\Delta^4$-3,20-diketo function.

The fact that halogens and sulfuryl halides will dehydrate 11β-hydroxy steroids (I) in the presence of anhydrous sulfur dioxide and an organic base is quite unexpected. Under ordinary conditions, halogens and sulfuryl halides either oxidize steroids or halogenate them, particularly at unsaturated positions. However, the presence of anhydrous sulfur dioxide modifies the usually observed chemistry of halogens and sulfuryl halides to make dehydration possible.

When a halogen is used, at least one mole of sulfur dioxide and three moles of an organic base are needed per mole of steroid (and halogen) reacted. The sulfur dioxide reacts to form sulfur trioxide; one mole of base complexes with the sulfur trioxide produced; and the other two moles of base neutralize the 2 moles of acid produced. For example, when bromine reacts with an 11β-hydroxy steroid (I) the following equation characterizes the chemical reaction:[1]

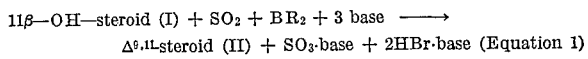

In the case of a sulfuryl halide such as sulfuryl chloride, the reaction requires only a catalytic amount of sulfur dioxide. In this case the following equation characterizes the chemical reaction:

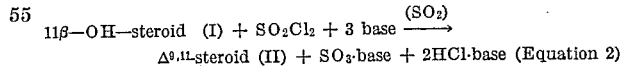

The preferred method of dehydration is to dissolve the hydroxy steroid in a solvent, adding the necessary base (if not already present as part of the solvent) and anhydrous sulfur dioxide, and then adding the halogen or sulfuryl halide (as a solution if desired). Cooling is necessary since the reaction is exothermic. After completing the dehydration, the reaction mixture, usually a slurry, is worked up to recover the desired product.

Halogens (chlorine, bromine or iodine) and mixed halogens, such as iodine monochloride, can be used. Sulfuryl halides of the general formula $SO_2X_2$, where X is selected from the previously named halogens, can be used also. The preferred reagent is bromine used in 5–10% molar excess over the amount of steroid being dehydrated. The halogen or sulfuryl halide is never allowed to contact the steriod in the absence of sulfur dioxide.

The dehydration reaction is carried out in the presence of an organic base. Typical examples of such organic bases are pyridine, N-alkylpiperidines, lutidines, collidines, formamide, alkylformamides and trialkylamines. Pyridine is of particular interest because of its availability. The base is preferably present in from three to ten moles for each mole of steroid. Excess base is not harmful. The base selected is preferably one which also acts as a solvent for the 11β-hydroxy steroid (1). The role of the base is more complicated than that shown by the above chemical reaction Equations 1 and 2, i.e., it "complexes" with the halogens, sulfur dioxide, sulfur trioxide and acid halides produced and participates directly in the reaction itself.

Sulfur dioxide gives the reaction its specificity for dehydration. With halogens, one to two moles of sulfur dioxide is preferably present for each mole of halogen added. Excess sulfur dioxide is not harmful but a deficiency is. With sulfuryl halides, only a catalytic amount is necessary.

The dehydration reaction is conveniently carried out in a solvent for the starting steroid (I). The solvent can also conveniently serve as the organic base. The solvent can be a mixture of a hydrocarbon and an organic base, such as benzenepyridine or a mixture of a chlorinated hydrocarbon and an organic base, such as methylene chloride and pyridine. Other solvents which can be used are dimethylformamide, tetrahydrofuran, diethylacetamide, chloroform, acetone, methyl ethyl ketone, and anhydrous mixtures of these solvents.

The time required for dehydration depends in part upon the particular reactants, solvents, and temperature. Using bromine and 11β-hydroxy steroids (I) the reaction appears to be instantaneous, even at less than 0° C., as shown by the lack of color during the halogen addition except towards the end of the reaction. It is generally desirable to proceed at lower temperatures to reduce the likelihood of decomposition and other side reactions.

The term "anhydrous" when used herein means that the reaction mixture contains less than about one molar equivalent of water, calculated on the steroid. Small quantities of water are compensated for by adding an equivalent amount of the dehydrating reagents as in Equations 1 and 2 when the steroid (I) is replaced by water. Unless this water is so accounted for, the amount of 9(11)-dehydro steroid product (II) is reduced, and the reaction is incomplete.

Several methods for the introduction of the 9(11)-double bond into the steroid nucleus by the elimination of the elements of water from 11-hydroxylated starting materials have been reported prior to the invention of the present process; e.g., see: J. Amer. Chem. Soc. 75, 2273; 76, 2227; 77, 4181; 79, 1130; 80, 3161; 80, 4431 and U.S. Patent 3,045,031. However, the aforesaid articles show a much lower formation of 9(11)-dehydro compound (in those instances where percentage of theoretical yield is indicated) than is produced by the process of this invention. Likewise, in the above-noted patent, less than half the amount of 9(11)-compound is obtained by the method described therein compared with the yields of the present process; here, the product (II) is recovered by filtration and is of excellent quality, so that it can be put to its intended use without further purification, while there, chromatography is necessary for its isolation and purification; here, inexpensive halogens or sulfuryl halides are employed as the dehydrating agent, while there, costly N-bromoacetamide must be used.

DETAILED DESCRIPTION

It is to be understood that the invention is not to be limited to the exact details of operation or exact compounds shown and described herein, as obvious modifications and equivalents will be apparent to one skilled in the art, and the invention is therefore to be limited only by the scope of the appended claims.

*Example 1.—4,9(11)-androstadiene-3,17-dione (II)*

A solution of 15 g. (0.0497 mole) of 11β-hydroxy-4-androstene-3,17-dione (I) and about 4.2 g. (0.066 mole) of anhydrous sulfur dioxide in 45 ml. of pyridine was prepared and held at about 25° C. A solution of 8.4 g. (0.053) mole) of bromine in 33 ml. of pyridine was then prepared by slowly adding the bromine to the pyridine with cooling to keep the temperature of the solution below 20° C. The bromine solution was then added to the cooled solution of steroid (I) and sulfur dioxide with efficient stirring, while holding the temperature of the reaction mixture below 30° C. About halfway through the addition of the bromine solution, a white precipitate appeared but the yellow-gold color indicating excess of bromine in the reaction medium did not appear until all of it was added. At the end of the addition, the slurry that formed was stirred for about 15 minutes, then any excess bromine remaining and sulfur trioxide·base produced was decomposed by slowly adding 10 ml. of water to the slurry with cooling, whereupon the solids dissolved. The steroid product (II) was then precipitated from this liquid by adding 170 ml. of 2.5 N hydrochloric acid and cooling to about 0° C. with stirring for about 1 hour. The product (II) was collected by filtration, rinsed with 400 ml. of water and dried in a vacuum oven at 60° C. to constant weight. The yield of product, 4,9(11)-androstadiene-3,17-dione (II), weighed 13.3 g. (94% of theoretical); melting point 195 to 200° C.; $[\alpha]_D$ +215° (chloroform);

$$\lambda_{max.}^{EtOH}\ 238\ m\mu$$

$\epsilon$=16,500; quantitative vapor phase chromatography (V.P.C.) indicated 98% purity; qualitative thin layer chromatography (T.L.C.) showed no starting material (I) present. An authentic sample of purified material (II) had the following physical properties: melting point 200 to 204° C.; $[\alpha]_D$ +220° (chloroform);

$$\lambda_{max.}^{EtOH}\ 238\ m\mu$$

$\epsilon$=16,400.

Following the procedure of Example 1 but substituting another organic base for pyridine, e.g., piperidine, lupetidine, copellidine, pipecoline, conine, picoline, lutidine, collidine, parvuline, triethylamine, formamide, methylformamide, diethylformamide, etc., also yields 4,9(11)-androstadiene-3,17-dione (II).

Following the procedure of Example 1 but substituting for bromine, either chlorine, iodine or a sulfuryl halide (e.g., sulfuryl chloride, sulfuryl bromide or sulfuryl iodide), also yields 4,9(11)-androstadiene-3,17-dione (II).

Following the procedure of Example 1 but substituting another organic base for pyridine and substituting chlorine, iodine or a sulfuryl halide for bromine, also yields 4,9(11)-androstadiene-3,17-dione (II).

*Example 2.—17α,21-dihydroxy-4,9(11)-pregnadiene-3,20-dione 21-acetate (II)*

A solution was prepared from 80 g. (0.198 mole) of 11β,17α,21-trihydroxy-4-pregnene-3,20-dione 21 - acetate (I) by heating it in 340 ml. of pyridine to about 50° C. and then cooling to about 25° C. A solution of about 16.5 g. (0.258 mole) of anhydrous sulfur dioxide in 120 ml. of pyridine was prepared at about 25° C. and then added to the steroid (I) solution and the resulting solution cooled to about 0° C. A solution of 33.3 g. (0.208 mole) of bromine in 120 mls. of pyridine was prepared by slowly adding the bromine to the pyridine with cooling so as to hold the temperature of the solution below 20° C. The bromine solution was then added slowly to the well-stirred, cooled steroid (I) and sulfur dioxide solution so as to keep the temperature between about 0° to about 5° C. A white precipitate appeared when about 20% of the bromine addition was complete; the slurry that resulted became quite thick at about half way through the addition, the white slurry showing yellow-gold streaks on its top where the bromine solution was being stirred into the steroid (I) and sulfur dioxide solution. The last 10% of the addition caused the slurry to turn a uniform yellow-gold which gradually faded to a cream color 30 minutes after the addition of the bromine solution was completed. Any excess bromine remaining and the sulfur trioxide·base produced was decomposed (exothermically) by slowly adding water to the slurry with cooling to keep the temperature below 10° C. The steroid product (II) did not dissolve although the slurry became much thinner when about 10 ml. of water was added. The remainder of the steroid product (II) was precipitated by adding a total of 920 ml. of water and cooling to 0° C. with stirring for about 1 hour. The product (II), which filtered slowly, was collected, rinsed with 1.5 l. of water and dried in a vacuum oven at 95° C. to constant weight. The yield of light-cream-colored product, 17α,21-dihydroxy-4,9(11)-pregnadiene-3,20-dione 21-acetate (II), weighed 75 gms. (97% of theoretical); melting point 224 to 230° C.; qualitative T.L.C. showed the presence of about 4% of starting material (I).

Following the procedure of Example 2 but substituting another organic base for pyridine, e.g., piperidine, lupetidine copellidine, pipecoline, conine, picoline, lutidine, collidine, parvuline, triethylamine, formamide, methylformamide, diethylformamide, etc., also yields 17α,21-dihydroxy-4,9(11)-pregnadiene-3,20-dione 21-acetate.

Following the procedure of Example 2 but substituting for bromine, either chlorine, iodine or a sulfuryl halide (e.g., sulfuryl chloride, sulfuryl bromide or sulfuryl iodide), also yields 17α,21-dihydroxy-4,9(11)-pregnadiene-3,20-dione 21-acetate (II).

Following the procedure of Example 2 but substituting another organic base for pyridine and substituting chlorine, iodine or a sulfuryl halide for bromine, also yields 17α,21 - dihydroxy-4,9(11)-pregnadiene-3,20-dione 21-acetate (II).

*Example 3.—21-hydroxy-4,9(11),16-pregnatriene-3,20-dione 21-acetate (II)*

A solution was prepared from 51.5 g., 0.133 mole) of 11β,21-dihydroxy-4,16-pregnadiene-3,20-dione 21-acetate (I) by heating in 93 ml. of pyridine to about 45° C. and then cooling to about −15° C. A solution of 12.2 g. (0.19 mole) of anhydrous sulfur dioxide in 25 ml. of pyridine was prepared at about 25° C. and then added to the steroid (I) solution. A solution of 23.4 g. (0.146 mole) of bromine in 50 ml. of pyridine was prepared by slowly adding the bromine to the pyridine with cooling so as to hold the temperature of the solution below 20° C. The bromine solution was then added slowly to the well-stirred, cooled steroid (I) and sulfur dioxide solution so as to keep the temperature below −5° C. A precipitate appeared when about half of the bromine solution had been added. The reaction mixture was stirred for about 15 minutes after completing the addition of bromine solution, whereupon 500 mls. of water was gradually added at below 0° C. to decompose any excess bromine remaining and sulfur trioxide·base produced and to precipitate the product (II). With the addition of 20 ml. of water all of the solids had dissolved. Addition of the remaining water with stirring at about −10° C. for about 30 minutes caused complete precipitation of the product (II). It was filtered, rinsed with 500 ml. of water and dried to constant weight in a vacuum oven at 60° C. The yield of product, 21-hydroxy - 4,9(11),16 - pregnatriene-3,20-dione 21-acetate (II), was 43.7 g. (89% of thoretical), melting point 118 to 123° C.; [α]$_D$ +170° (chloroform);

$$\lambda_{max.}^{OHE^1} \ 239 \ m\mu$$

ε=22,500; qualitative T.L.C. showed no starting material (I). An authentic purified material had the following physical properties: melting point, 130 to 131° C.; [α]$_D$ +189°;

$$\lambda_{max.}^{EtOH} \ 238 \ m\mu$$

ε=25,400.

Following the procedure of Example 3 but substituting another organic base for pyridine, e.g., piperidine, lupetidine, copellidine, pipecoline, conine, picoline, lutidine, collidine, parvuline, triethylamine, formamide, methylformamide, diethylformamide, etc., also yields 21-hydroxy-4,9(11),16-pregnatriene-3,20-dione 21-acetate (II).

Following the procedure of Example 3 but substituting for bromine, either chlorine, iodine or a sulfuryl halide (e.g., sulfuryl chloride, sulfuryl bromide or sulfuryl iodide), also yields 21-hydroxy-4,9(11),16-pregnatriene-3,20-dione 21-acetate (II).

Following the procedure of Example 3 but substituting another organic base for pyridine and substituting chlorine, iodine or a sulfuryl halide for bromine, also yields 21-hydroxy-4,9(11),16-pregnatriene-3,20-dione 21-acetate (II).

*Example 4.—4,9(11)-pregnadiene-3,20-dione (II)*

A solution of 3.3 g. (0.010 mole) of 11β-hydroxy-4-pregnene-3,20-dione (I) and 1.15 g. (0.018 mole) of anhydrous sulfur dioxide in 10 ml. of pyridine was cooled to about 0° C. Then 1.69 g. (0.0104 mole) of bromine was dissolved in 6 ml. of pyridine below 10° C. The bromine solution was then slowly added to the steroid (I) and sulfur dioxide solution with cooling to keep the temperature below 5° C. A slurry formed after the addition was completed and the reaction mixture stirred about 5 minutes longer at about 0° C. About 60 ml. of water was added thereto (with the production of a large initial exotherm) while keeping its temperature below 20° C. The reaction mixture was poured into a beaker containing 50 ml. of water. The product (II) that separated was collected by filtration, rinsed successively with two 5 ml. portions of water, 5 ml. of 2% aqueous acetic acid, and two more 5 ml. portions of water, and dried to constant weight at 58° C. in a vacuum oven. The yield of product 4,9(11)-pregnadiene-3,20-dione (II), was 3.08 g. (99% of theoretical); qualitative T.L.C. showed that no starting material (I) remained. A 3.0 g. sample of the product (II) was recrystallized from 5 ml. of methanol and 2 ml. of water, cooled to room temperature and then 5° C. for about 16 hours, filtered, rinsed with a mixture of cold methanol and water, and dried to constant weight at 60° C. in a vacuum oven. The yield of recrystallized product (II) was 2.9 g. which had a melting point of 121 to 122° C. Further recrystallizations did not change the melting point.

Following the procedure of Example 4 but substituting another organic base for pyridine, e.g., piperidine, lupetidine, copellidine, pipecoline, conine, picoline, lutidine, collidine, parvuline, triethylamine, formamide, methylformamide, diethylformamide, etc., also yields 4,9(11)-pregnadiene-3,20-dione (II).

Following the procedure of Example 4 but substituting for bromine, either chlorine, iodine or a sulfuryl halide (e.g., sulfuryl chloride, sulfuryl bromide or sulfuryl iodide), also yields 4,9(11)-pregnadiene-3,20-dione (II).

Following the procedure of Example 4 but substituting another organic base for pyridine and substituting chlorine, iodine or a sulfuryl halide for bromine, also yields 4,9(11)-pregnadiene-3,20-dione (II).

*Example 5.—21-hydroxy-1,4,9(11), 16-pregnatetraene-3,20-dione 21-acetate (II)*

Following the procedures of Examples 1 through 4, but substituting 11β,21-dihydroxy-1,4,16-pregnatriene-3,20-dione 21-acetate (I) as starting material and substituting a mixture of dimethylformamide and pyridine for pyridine alone as organic base, gives 21-hydroxy-1,4,9(11),16-pregnatetraene - 3,20-dione 21-acetate (II) in amounts in excess of 90% of the theoretical yield.

Following the procedure of Example 5 but substituting another organic base for a mixture of dimethylformamide and pyridine, e.g., pyridine, piperidine, lupetidine, copellidine, pipecoline, conine, picoline, lutidine, collidine, parvuline, triethylamine, formamide, methylformamide, diethylformamide, etc., also yields 21-hydroxy-1,4,9(11), 16-pregnatetraene-3,20-dione 21-acetate (II).

Following the procedure of Example 5 but substituting another organic base for the mixture of dimethylformamide and pyridine and substituting chlorine, iodine or a sulfuryl halide for bromine, also yields 21-hydroxy-1,4,9(11),16-pregnatetraene-3,20-dione 21-acetate (II).

*Example 6.—21-hydroxy-16α,17α-oxido-4,9(11)-pregnadiene-3,20-dione 21-acetate (II)*

Following the procedures of Examples 1 through 4, but substituting 32 g. of 11β,21-dihydroxy-16α·17α-oxido-4-pregene-3,20-dione 21-acetate (I) as starting material and substituting a mixture of dimethylformamide and pyridine for pyridine alone as organic base, yields 25.5 gms. (83% of theoretical) of crude 21-hydroxy-16α,17α-oxido-4,9(11)-pregnadiene-3,20-dione 21-acetate (II).

Following the procedure of Example 6 but substituting another organic base for a mixture of dimethylformamide and pyridine, e.g., pyridine, piperidine, lupetidine, copellidine, pipecoline, conine, picoline, lutidine, collidine, parvuline, triethylamine, formamide, methylformamide, diethylformamide, etc.

Following the procedure of Example 6 but substituting for bromine, either chlorine, iodine or a sulfuryl halide (e.g., sulfuryl chloride, sulfuryl bromide or sulfuryl iodide), also yields 21-hydroxy-16α,17α-oxido-4,9(11)-pregnadiene-3,20-dione 21-acetate (II).

Following the procedure of Example 6 but substituting another organic base for the mixture of dimethylformamide and pyridine and substituting chlorine, iodine or a sulfuryl halide for bromine, also yields 21-hydroxy-16α,17α-oxido-4,9(11)-pregnadiene-3,20-dione 21-acetate (II).

*Example 7.—21-hydroxy-16α,17α-oxido-1,4,9(11)-pregnatriene-3,20-dione 21-acetate (II)*

Following the procedures of Examples 1 through 4, but substituting 40.05 g. of crude 11β,21-hydroxy-16α,17α-oxido-1,4-pregnadiene-3,20-dione 21-acetate (I) as starting material and substituting a mixture of dimethylformamide and pyridine for pyridine alone as the organic base yields 30.58 g. (80% of theoretical) of crude 21-hydroxy-16α,17α-oxido-1,4,9(11)-pregnatriene-3,20-dione 21-acetate (II), having a melting point of 193 to 199° C.

Following the procedure of Example 7 but substituting another organic base for a mixture of dimethylformamide and pyridine, e.g., pyridine, piperidine, lupetidine, copellidine, pipecoline, conine, picoline, lutidine, collidine, parvuline, triethylamine, formamide, methylformamide, diethylformamide, etc., also yields 21-hydroxy-16α,17α-oxido-1,4,9(11)-pregnatriene-3,20-dione 21-acetate (II).

Following the procedure of Example 7 but substituting for bromine, either chlorine, iodine or a sulfuryl halide (e.g., sulfurylchloride, sulfuryl bromide or sulfuryl iodide), also yields 21-hydroxy-16α,17α-oxido-1,4,9(11)-pregnatriene-3,20-dione 21-acetate (II).

Following the procedure of Example 7 but substituting another organic base for a mixture of dimethylformamide and pyridine and substituting chlorine, iodine or a sulfuryl halide for bromine, also yields 21-hydroxy-16α,17α-oxido-1,4,9(11)-pregnadiene-3,20-dione 21-acetate (II).

*Example 8.—17α,21-dihydroxy-4,9(11)-pregnadiene-3,20-dione 21-acetate (II)*

A solution of 80 g. (0.198 mole) of 11β,17α,21-trihydroxy-4-pregnene-3,20-dione 21-acetate (I) and 25 g. (0.39 mole) of anhydrous sulfur dioxide in 580 ml. of pyridine was heated to 35° C. Next 52.8 g. (0.208 mole) of iodine was added directly to the steroid (I) and sulfur dioxide solution and stirred without any apparent exothermic reaction, whereupon the temperature of the solution was raised to about 60° C. All of the iodine crystals dissolved within about 30 minutes and the solution was a deep brown-purple color. The reaction was stopped after about 5 hours by the addition of 500 ml. of water and cooling to about 25° C. An initial crop of steriod product (II) was filtered off, rinsed with 1000 ml. of water and dried in a vacuum oven at 90° C. to constant weight. The yield of the first crop of the product, 17α,21-dihydroxy-4,9(11)-pregnadiene-3,20-dione 21-acetate (II), was 15 g. (18% of theoretical); semiquantitative T.L.C. showed that it contained about 8% of starting material (I). A second crop was recovered, but qualitative T.L.C. showed that it contained only starting material (I).

Following the procedure of Example 8 but substituting another organic base for pyridine, e.g., piperidine, lupetidin, copellidine, pipecoline, conine, picoline, lutidine, collidine, parvuline, triethylamine, formamide, methylformamaide, diethylformamide, etc., also yields 17α,21-dihydroxy-4,9(11)-pregnadiene-3,20-dione 21-acetate (II).

Following the procedure of Example 8 but substituting for iodine, either chlorine, bromine or a sulfuryl halide (e.g., sulfuryl chloride, sulfuryl bromide or sulfuryl iodide), also yields 17α,21-dihydroxy-4,9(11)-pregnadiene-3,20-dione 21-acetate (II).

Following the procedure of Example 8 but substituting another organic base for pyridine and substituting chlorine, bromine or a sulfuryl halide for iodine, also yields 17α,21-dihydroxy-4,9(11)-pregnadiene-3,20-dione 21-acetate (II).

*Example 9.—17α,21-dihydroxy-4,9(11)-pregnadiene-3,20-dione 21-acetate (II)*

A solution of 80 g. (0.198 mole) of 11β,17α,21-trihydroxy-4-pregnene-3,20-dione 21-acetate (I) and 32.6 g. (0.51 mole) of anhydrous sulfur dioxide in 580 ml. of dry pyridine was cooled to about −5° C. Next 17.6 ml. (0.22 mole) of sulfuryl chloride was added slowly to the steroid (I) and sulfur dioxide solution while keeping the temperature of the reaction mixture below 0° C. The addition did not appear to be as exothermic as when bromine was employed (e.g., in Example 2) and no solid precipitate formed. After stirring for about 30 minutes upon the completion of the addition, 920 ml. of water was added at below 0° C. to decompose any excess sulfuryl chloride remaining and sulfur trioxide·base produced by the reaction and to precipitate the product (II). The product was collected, rinsed with 1500 ml. of water, and dried to constant weight in a vacuum oven at 100° C. The yield of product, 17α,21-dihydroxy-4,9(11)-pregnadiene-3,20-dione 21-acetate (II), was 45.8 g.; its T.L.C. showed it to be 10 to 20% of the desired product (II) and the remainder unreacted starting material (I).

Following the procedure of Example 9 but substituting another organic base for pyridine, e.g., piperidine, lupetidine, copellidine, pipecoline, conine, picoline, lutidine, collidine, parvuline, triethylamine, formamide, methylformamide, diethylformamide, etc., also yields 17α,21-dihydroxy-4,9(11)-pregnadiene-3,20-dione 21-acetate (II).

Following the procedure of Example 9 but substituting for sulfuryl chloride, either chlorine, bromine, iodine or another sulfuryl halide (e.g., sulfuryl bromide or sulfuryl iodide), also yields 17α,21-dihydroxy-4,9(11)-pregnadiene-3,20-dione 21-acetate (II).

Following the procedure of Example 9 but substituting another organic base for pyridine and substituting chlorine, bromine, iodine or sulfuryl bromide or sulfuryl iodide, for sulfuryl chloride, also yields 17α,21-dihydroxy-4,9(11)-pregnadiene-3,20-dione 21-acetate (II).

Example 10

In this example certain representative $\Delta^{9(11)}$-steroid compounds (II) are prepared from their $11\beta$ - hydroxy counterparts (I) by the novel process of this invention, which is illustratively represented by the following reaction:

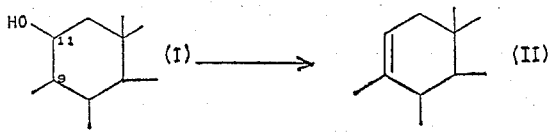

Following the procedure of Examples 1 through 9, but substituting for the starting materials (I) employed therein, representative starting compounds (I) such as:

(1) $11\beta,17\beta$-dihydroxy-4-androsten-3-one (I),
(2) $11\beta,17\beta$-dihydroxy-$17\alpha$-methyl-4-androsten-3-one (I),
(3) $11\beta,17\beta$-dihydroxy-1,4-androstadien-3-one (I),
(4) $11\beta,17\beta$-dihydroxy-$17\alpha$-ethynyl-4-androsten-3-one (I),
(5) $11\beta,17\beta$-dihydroxy-2(hydroxymethylene)-$17\alpha$-methyl-$5\alpha$-androstan-3-one (I),
(6) $11\beta,17\beta$-dihydroxy-$5\alpha$-androstan-3-one 17-propionate (I),
(7) $11\beta,17\beta$-dihydroxy-$2\alpha$-methyl-$5\alpha$-androstan-3-one 17-propionate (I),
(8) $11\beta,17\beta$-dihydroxy-19-nor-$17\alpha$-ethynyl-5(10)-androsten-3-one (I),
(9) $11\beta,17\beta$-dihydroxy-19-nor-$17\alpha$-ethynyl-4-androsten-3-one (I),
(10) $11\beta,17\beta$-dihydroxy-$13\beta$-ethyl-19-nor-$17\alpha$-ethynyl-4-androsten-3-one (I),
(11) $11\beta,17\beta$-dihydroxy-$6\alpha$-methyl-$17\alpha$-ethynyl-4-androsten-3-one (I),
(12) $11\beta,17\beta$-dihydroxy-1-methyl-1-androsten-3-one 17-acetate (I),
(13) $11\beta$-hydroxyestrone (I),
(14) $11\beta$-hydroxyestrone 3-methyl ether (I),
(15) $11\beta$-hydroxy-$7\alpha$-methylestrone (I),
(16) $11\beta$-hydroxyestradiol (I),
(17) $11\beta$-hydroxyestradiol 3-methyl ether (I),
(18) $11\beta$-hydroxy-$7\alpha$-methylestradiol 3-methyl ether (I),
(19) $11\beta$-hydroxy-$17\alpha$-methylestradiol (I),
(20) $11\beta$-hydroxy-$17\alpha$-methylestradiol 3-methyl ether (I),
(21) $11\beta$-hydroxy-$7\alpha,17\alpha$-dimethylestradiol (I),
(22) $11\beta$-hydroxy-$17\alpha$-ethynylestradiol (I),
(23) $11\beta$-hydroxy-$17\alpha$-ethynylestradiol 3-acetate (I),
(24) $11\beta$-hydroxy-$17\alpha$-(1-propynyl)estradiol 3-methyl ether (I),
(25) $11\beta$-hydroxy-$7\alpha$-methyl-$17\alpha$-ethynylestradiol 3,17-diphenylacetate (I),
(26) $11\beta,17\alpha,21$-trihydroxy-1,4-pregnadiene-3,20-dione 21-acetate (I),
(27) $11\beta,17\alpha,21$-trihydroxy-$6\alpha$-methyl-1,4-pregnadiene-3,20-dione (I),
(28) $11\beta,17\alpha,21$-trihydroxy-$6\alpha$-fluoro-1,4-pregnadiene-3,20-dione (I),
(29) $11\beta,17\alpha$-dihydroxy-6-chloro-4,6-pregnadiene-3,20-dione 17-acetate (I),
(30) $11\beta,17\alpha$, 21-trihydroxy-$16\alpha$-methyl-1,4-pregnadiene-3,20-dione (I),
(31) $11\beta,17\alpha,21$-trihydroxy-$6\alpha$-fluoro-$17\alpha$-methyl-1,4-pregnadiene-3,20-dione 21-acetate (I),
(32) $11\beta,16\alpha,17\alpha,21$-tetrahydroxy-$6\alpha$-fluoro-4-pregnene-3,20-dione $16\alpha,17\alpha$-acetonide (I),
(33) $11\beta,16\alpha,17\alpha,21$-tetrahydroxy-1,4-pregnadiene-3,20-dione $16\alpha,17\alpha$-acetonide (I),
(34) $11\beta,17\alpha$-dihydroxy-$6\alpha$-methyl-4-pregnene-3,20-dione 17-acetate (I),
(35) $11\beta,21$-dihydroxy-4,6,16-pregnatriene-3,20-dione 21-acetate (I),
(36) $11\beta,21$-dihydroxy-$2\alpha$-methyl-1,4-pregnadiene-3,20-dione (I),
(37) $11\beta,17\alpha,21$-trihydroxy-6-fluoro-4-pregnene-3,20-dione (I),
(38) $11\beta,17\alpha,21$-trihydroxy-$6\alpha$-fluoromethyl-1,4-pregnadiene-3,20-dione 21-acetate (I),
(39) $11\beta,21$-dihydroxy-$6\alpha$-fluoro-1,4,16-pregnatriene-3,10-dione 21-acetate (I),
(40) $5\alpha,11\beta,21$-trihydroxy-3-(2,2-dimethylpropylenedioxy)-$6\beta$-methyl-16-pregnen-20-one 21-acetate (I),
(41) $11\beta,21$-dihydroxy-$2\alpha$-fluoro-$6\alpha$-methyl-1,4-pregnadiene-3,20-dione (I),
(42) $3\beta,11\beta,21$-trihydroxy-16-pregnen-20-one 3,21-diacetate (I),
(43) $11\beta,21$-dihydroxy-5-pregnene-3,20-dione 3-ethylene ketal 21-acetate (I),
(44) $11\beta,21$-dihydroxy-$2a,6a$-difluoro-4-pregnene-3,20-dione 21-acetate (I),
(45) $11\beta,17a,21$-trihydroxy-2,4-dimethyl-1,4-pregnadiene-3,20-dione 21-acetate (I),
(46) $11\beta,17a,21$-trihydroxy-$7a$-methyl-4-pregnene-3,20-dione 21-acetate (I),
(47) $11\beta,21$-dihydroxy-2,16-difluoro-1,4,16-pregnatriene-3,20-dione 21-acetate (I),
(48) $11\beta,17\alpha$-dihydroxy-6-methyl-16-methylene-4,6-pregnadiene-3,20-dione 17-acetate (I),
(49) $11\beta,17\alpha$-dihydroxy-$5\alpha$-pregnane-3,20-dione (I) and
(50) $11\beta$-hydroxy-$6\beta$-methyl-$5\alpha$-pregnane-3,20-dione (I) yields, respectively, (1) $17\beta$-hydroxy-4,9(11)-androstadien-3-one (II),
(2) $17\beta$-hydroxy-$17\alpha$-methyl-4,9(11)-androstadien-3-one (II),
(3) $17\beta$-hydroxy-1,4,9(11)-androstatrien-3-one (II),
(4) $17\beta$-hydroxy-$17\alpha$-ethynyl-4,9(11)-androstadien-3-one (II),
(5) 9(11)-dehydro-$17\beta$-hydroxy-2(hydroxymethylene)-$17\alpha$-methyl-$5\alpha$-androstan-3-one (II),
(6) 9(11)-dehydro-$17\beta$-hydroxy-$5\alpha$-androstan-3-one 17-propionate (II),
(7) 9(11)-dehydro-$17\beta$-hydroxy-$2\alpha$-methyl-$5\alpha$-androstan-3-one 17-propionate (II),
(8) $17\beta$-hydroxy-19-nor-$17\alpha$-ethynyl-5(10),9(11)-androstadien-3-one (II),
(9) $17\beta$-hydroxy-19-nor-$17\alpha$-ethynyl-4,9(11)-androstadien-3-one (II),
(10) $17\beta$-hydroxy-$13\beta$-ethyl-19-nor-$17\alpha$-ethynyl-4,9(11)-androstadien-3-one (II),
(11) $17\beta$-hydroxy-$6\alpha$-methyl-$17\alpha$-ethynyl-4,9(11)-androstadien-3-one (II),
(12) $17\beta$-hydroxy-1-methyl-1,9(11)-androstadien-3-one 17-acetate (II),
(13) 9(11)-dehydrostrone (II),
(14) 9(11)-dehydroestrone 3-methyl ether (II),
(15) 9(11)-dehydro-$7\alpha$-methylestrone (II),
(16) 9(11)-dehydroestradiol (II),
(17) 9(11)-dehydroestradiol 3-methyl ether (II),
(18) 9(11)-dehydro-$7\alpha$-methylestradiol 3-methyl ether (II),
(19) 9(11)-dehydro-$17\alpha$-methylestradiol (II),
(20) 9(11)-dehydro-$17\alpha$-methylestradiol 3-methyl ether (II),
(21) 9(11)-dehydro-$7\alpha,17\alpha$-dimethylestradiol (II),
(22) 9(11)-dehydro-$17\alpha$-ethynylestradiol (II),
(23) 9(11)-dehydro-$17\alpha$-ethynylestradiol 3-acetate (II),
(24) 9(11)-dehydro-$17\alpha$-(1-propynyl)estradiol 3-methyl ether (II),
(25) 9(11)-dehydro-$7\alpha$-methyl-$17\alpha$-ethynylestradiol 3,17-diphenyl-acetate (II),
(26) $17\alpha,21$-dihydroxy-1,4,9(11)-pregnatriene-3,20-dione 21-acetate (II),
(27) $17\alpha,21$-dihydroxy-$6\alpha$-methyl-1,4,9(11)-pregnatriene-3,20-dione (II),

(28) 17α,21-dihydroxy-6α-fluoro-1,4,9(11)-pregnatriene-3,20-dione (II),
(29) 17α-hydroxy-6-chloro-4,6,9(11)-pregnatriene-3,20-dione 17-acetate (II),
(30) 17α,21-dihydroxy-16α-methyl-1,4,9(11)-pregnatriene-3,20-dione (II),
(31) 17α,21-dihydroxy-6α-fluoro-16α-methyl-1,4,9(11)-pregnatriene-3,20-dione 21-acetate (II),
(32) 16α,17α,21-trihydroxy-6α-fluoro-4,9(11)-pregnadiene-3,20-dione 16α,17α-acetonide (II)
(33) 16α,17α,21-trihydroxy-1,4,9(11)-pregnatriene-3,20-dione 16α,17α-acetonide (II),
(34) 17α-hydroxy-6α-methyl-4,9(11)-pregnadiene-3,20-dione 17-acetate (II),
(35) 21-hydroxy-4,6,9(11),16-pregnatetraene-3,20-dione 21-acetate (II),
(36) 21-hydroxy-2α-methyl-1,4,9(11)-pregnatriene-3,20-dione (II),
(37) 17α,21-dihydroxy-6-fluoro-4,9(11)-pregnadiene-3,20-dione (II),
(38) 17α,21-dihydroxy-6α-fluoromethyl-1,4,9(11)-pregnatriene-3,20-dione 21-acetate (II),
(39) 21-hydroxy-6α-fluoro-1,4,9(11),16-pregnatetraene-3,20-dione 21-acetate (II),
(40) 5α,21-dihydroxy-3-(2,2-dimethylpropylenedioxy)-6β-methyl-9(11),16-pregnadien-20-one 21-acetate (II),
(41) 21-hydroxy-2α-fluoro-6α-methyl-1,4,9(11)-pregnatriene-3,20-dione (II),
(42) 3β,21-dihydroxy-9(11),16-pregnadien-20-one 3,21-diacetate (II),
(43) 21-hydroxy-5,9(11)-pregnadiene-3,20-dione 3-ethylene ketal 21-acetate (II),
(44) 21-hydroxy-2α,6α-difluoro-4,9(11)-pregnadiene-3,20-dione 21-acetate (II),
(45) 17α,21-dihydroxy-2,4-dimethyl-1,4,9(11)-pregnatriene-3,20-dione 21-acetate (II),
(46) 17α,21-dihydroxy-7α-methyl-4,9(11)-pregnadiene-3,20-dione 21-acetate (II),
(47) 21-hydroxy-2,16-difluoro-1,4,9(11),16-pregnatetraene-3,20-dione 21-acetate (II),
(48) 17α-hydroxy-6-methyl-16-methylene-4,6,9(11)-pregnatriene-3,20-dione 17-acetate (II),
(49) 9(11)-dehydro-17α-hydroxy-5α-pregnane-3,20-dione (II), and
(50) 9(11)-dehydro-6β-methyl-5α-pregnane-3,20-dione (II).

I claim:
1. A process for the production of a 9(11)-dehydro steroid selected from the group consisting of steroids of the androstane series and pregnane series, which comprises the steps of
(1) mixing a corresponding 11β-hydroxy steroid, under anhydrous conditions and in an organic base, with anhydrous sulfur dioxide, and
(2) mixing the solution resulting from step (1) with a material selected from the group consisting of chlorine, bromine, iodine, sulfuryl chloride, sulfuryl bromide and sulfuryl iodide, to yield said corresponding 9(11)-dehydro steroid, above.

2. A process in accordance with claim 1 wherein the organic base of step (1) is pyridine and the material of step (2) is bromine.

3. A process in accordance with claim 1 wherein the starting material of step (1) is 11β-hydroxy-4-androstene-3,17-dione and the product of step (2) is 4,9(11)-androstadiene-3,17-dione.

4. A process in accordance with claim 1 wherein the starting material of step (1) is 11β,17α,21-trihydroxy-4-pregnene-3,20-dione 21-acetate and the product of step (2) is 17α,21-dihydroxy-4,9(11)-pregnadiene-3,20-dione 21-acetate.

5. A process in accordance with claim 1 wherein the starting material of step (1) is 11β,21-dihydroxy-4,16-pregnadiene-3,20-dione 21-acetate and the product of step (2) is 21-hydroxy-4,9(11),16-pregnatriene-3,20-dione 21-acetate.

6. A process in accordance with claim 1 wherein the starting material of step (1) is 11β-hydroxy-4-pregnene-3,20-dione and the product of step (2) is 4,9(11)-pregnadiene-3,20-dione.

7. A process in accordance with claim 1 wherein the starting material of step (1) is 11β,21-dihydroxy-1,4,16-pregnatriene-3,20-dione 21-acetate and the product of step (2) is 21-hydroxy-1,4,9(11),16-pregnatetraene-3,20-dione 21-acetate.

8. A process in accordance with claim 1 wherein the starting material of step (1) is 11β,21-dihydroxy-16α,17α-oxido-4-pregnene-3,20-dione 21-acetate and the product of step (2) is 21-hydroxy-16α,17α-oxido-4,9(11) - pregnadiene-3,20-dione 21-acetate.

9. A process in accordance with claim 1 wherein the starting material of step (1) is 11β,21-dihydroxy-16α,17α-oxido-1,4-pregnadiene-3,20-dione 21-acetate and the product of step (2) is 21-hydroxy-16α,17α-oxido-1,4,9(11)-pregnatriene-3,20-dione 21-acetate.

10. A process in accordance with claim 1 wherein the starting material of step (1) is 11β,17α,21-trihydroxy-16α-methyl-1,4-pregnadiene-3,20-dione and the product of step (2) is 17α,21-dihydroxy-16α-methyl-1,4,9(11) - pregnatriene-3,20-dione.

References Cited
UNITED STATES PATENTS
3,045,031  7/1962  Sepro et al.

HENRY A. FRENCH, *Primary Examiner.*

U.S. Cl. X.R.
260—397.3, 397.45, 397.5